2,964,572
Patented Dec. 13, 1960

2,964,572
CHEMICAL COMPOSITION AND PROCESS

George A. Miller, Painesville, and Clifford A. Neros, Willoughby, Ohio, assignors to Diamond Alkali Company, Cleveland, Ohio, a corporation of Delaware No Drawing. Filed Aug. 1, 1958, Ser. No. 752,432

25 Claims. (Cl. 260—651)

The present invention relates to the stabilization of a halogenated aromatic hydrocarbon comprising the addition thereto of a stabilizing amount of an aliphatic alkylene glycol; and more particularly relates to the stabilization of chlorinated xylenes and compositions containing chlorinated xylenes by addition thereto of a stabilizing amount of an aliphatic alkylene glycol.

It is known that a chlorinated xylene in a pure condition may be stored or shipped with little or no decomposition induced by exposure to air, light, heat and/or moisture. However, in many instances, obtaining and maintaining such high purity chlorinated xylenes or other chlorinated polymethyl benzenes in commercial production is not feasible. For example, it has been found that chlorinated polymethyl benzenes normally encountered in commerce are subject to some decomposition when in contact with substances such as specks of rust or aluminum, dirt, air, light, heat, moisture, and the like. Hence, means for preventing or inhibiting this decomposition of chlorinated polymethyl benzene and particularly chlorinated xylenes, or other chlorinated aromatic hydrocarbons generally associated therewith, are highly desirable.

Previously, various stabilizers for aliphatic chlorinated hydrocarbons have been employed. Some of these compounds which have demonstrated a degree of effectiveness are acetylenic alcohols, acetylenic ethers, straight chain acetylenic esters, monoacetylenic hydrocarbons, and monoacetylenic mono-olefinic hydrocarbons. Although these prior stabilizers have been used in the stabilization of aliphatic chlorinated hydrocarbons, surprisingly such materials are not satisfactory for the stabilization of chlorinated xylenes and specifically alpha-chloro-p-xylene.

Acetylenic alcohols are highly effective for the stabilization of such chlorinated aliphatic hydrocarbons as perchlorethylene but are ineffective for the stabilization of chlorinated xylenes such as alpha-chloro-p-xylene in that significant decomposition occurs even though the alpha-chloro-p-xylene contains relatively large quantities of these compounds. Monoacetylenic mono-olefinic hydrocarbons and straight chain alpha-acetylenic esters are unsatisfactory for the same reason.

Unstabilized quantities of halogenated aromatic hydrocarbons as produced, including such compounds as benzyl chloride, may be either in a relatively pure or impure condition. For the most part, the purity of such halogenated aromatic hydrocarbons depends upon its age, i.e., the length of time it has stood unstabilized after production without particular effort being made to prevent decomposition. Accordingly, a relatively impure halogenated aromatic hydrocarbon is found to be of limited utility for many industrial needs, although further decomposition may advantageously be inhibited by using the stabilizers of the present invention. On the other hand, some unstabilized halogenated aromatic hydrocarbons are employed while relatively fresh and are correspondingly pure and useable. Such materials require only stabilization against further decomposition in order to be satisfactory for a number of uses. Where the initial purity is not tolerable the chlorinated aromatic hydrocarbon may require pretreatment of a nature such that the major proportion or substantially all of the impurities are removed prior to the addition of stabilizers so as to provide a material having a good initial level of acceptability for industrial needs. As noted above, some chlorinated aromatic hydrocarbons may not require such pretreatment, although those skilled in the art will understand that a chlorinated xylene containing undesirable impurities may advantageously be treated for the removal or reduction of any impurities prior to the stabilization. Such purification may be effected through means common in the art, such as distillation.

In general, the present invention is directed to a composition comprising a halogenated aromatic hydrocarbon, e.g., especially a normally liquid chlorinated xylene, such as alpha-chloro-p-xylene, and a stabilizing amount of at least one aliphatic alkylene glycol, typically a poly lower alkylene glycol, and preferably those alkylene glycols which are soluble in alpha-chloro-p-xylene.

The term halogenated aromatic hydrocarbon is intended to refer to an aromatic hydrocarbon which has been chemically combined with halogen, i.e., fluorine, chlorine, bromine, and iodine. Aromatic hydrocarbon is defined as a compound of carbon and hydrogen containing in its structure a closed ring of carbon atoms, e.g., lower alkyl substituted benzene, benzene, naphthylene, lower alkyl substituted naphthylene, and anthracene. Illustrative aromatic hydrocarbons are mono or poly lower alkyl substituted benzenes, e.g., methylbenzenes, ethylbenzenes, isopropylbenzene, dimethyl benzene, trimethylbenzene, tetramethylbenzene, diethylbenzene, monomethylbenzene, and their isomers. However, the preferred hydrocarbons of this class are chain chlorinated poly lower alkyl benzenes and specifically chain chlorinated polymethyl benzenes, such as chlorinated xylenes, i.e., alpha-chloro-p-xylene.

Aliphatic alkylene glycols employed in the practice of this invention may be represented by the structure:

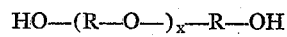

$$HO\!-\!(R\!-\!O\!-\!)_x\!-\!R\!-\!OH$$

wherein $x$ is a number from 0 to 34, inclusive, e.g., 1 to 20, R being an alkylene group, e.g., methylene, ethylene, propylene, butylene, isopropylene, pentylene, tetramethylene, trimethylene, and the like.

Among the suitable aliphatic alkylene glycols are ethylene glycol, propylene glycol, beta-butylene glycol, trimethylene glycol, hexylene glycol, and tetramethylene glycol, the preferred glycols being polyalkylene glycols, e.g., polypropylene glycol, typically having a molecular weight of greater than 100, e.g., 100 to 3000, inclusive, and polyethylene glycol, the preferred polyethylene glycols being those having a molecular weight between 100 and 1000, inclusive. In general, superior results are obtained using glycols which are soluble in alpha-chloro-p-xylene, e.g., polypropylene glycols and polyethylene glycols having a molecular weight between 100 and 1000.

Further, the invention is directed to such a composition including an additional ingredient effective to exert a stabilizing action against the influence of light, heat, moisture, metallic ions and other sources of decomposition. It will be understood that the invention is not limited to a particular light or other stabilizer and that, in general, any well-known light or other stabilizer may be employed with the general purpose stabilizers of this invention.

A preferred embodiment of the present invention comprises a composition of matter comprising essentially a normally liquid chain-chlorinated xylene and a stabilizing amount of at least one aliphatic alkylene glycol, e.g., polypropylene glycol and/or polyethylene glycol. This composition is particularly advantageous in the prevention of decomposition of alpha-chloro-p-xylene due to contact with contaminating metal ions, such as iron, iron oxide, ferric chloride, and aluminum ions.

As stated, the new class of stabilizers noted above, namely, aliphatic alkylene glycols, have been found particularly effective in stabilizing alpha-chloro-p-xylene contaminated with a minor amount of metallic ions such as those produced by specks of rust or aluminum, both in a liquid and in a vapor phase. For the most part, the stabilizing effect has been found to be the most pronounced and prolonged with pretreatment which removes the greater part of contaminated metallic ions has been resorted to prior to the addition of the stabilizing aliphatic alkylene glycol.

The method of stabilizing the chlorinated aromatic hydrocarbons in accordance with this invention comprises essentially contacting a major proportion of the halogenated aromatic hydrocarbon, i.e., the chlorinated toluene, chlorinated xylene, or chlorinated polymethyl benzene, with a stabilizing amount of the aliphatic alkylene glycol. It is preferred that the stabilizer be added after the initial preparation of the chlorinated aromatic hydrocarbon, i.e., after the chlorination step, and that a stabilizing amount of the aliphatic alkylene glycol be combined as noted above, i.e., in an amount of about 0.0001% to 5% by weight of the chlorinated aromatic hydrocarbon, preferably, however, from about 0.1% to 1% by weight of the chlorinated xylene. Under more adverse conditions, such as higher temperatures and/or excessive contamination, it may be necessary to add several percent of the stabilizer. Large quantities of stabilizer are seldom necessary or desirable and in most cases amounts of stabilizer less than 5% by weight of the chlorinated aromatic hydrocarbon protect the chlorinated aromatic hydrocarbon against decomposition under the most severe conditions normally encountered. The indicated intermediate preferred range is generally sufficiently effective where the purified chlorinated xylene contains not more than about 0.2% by weight of the metallic impurities most common in commercial production.

In order that those skilled in the art may better understand the present invention and in what manner the same may be carried into effect, the following specific examples are offered:

*Example I*

In order to demonstrate the effectiveness of the stabilizers of the present invention, alpha-chloro-p-xylene is stabilized with ethylene glycol. In this test, 25 ml. of alpha-chloro-p-xylene is placed in each of six 4-ounce clear glass containers; ethylene glycol is added to the first five solutions in concentrations of 0.0125 g., 0.0250 g., 0.125 g., 0.250 g., and 0.500 g., respectively. A metal contaminant comprising a mixture of 50% iron powder and 50% iron oxide was then added in concentration of from 0.01 g. to 0.5 g. per container. A series of the six solutions is prepared in this manner, the last solution being employed as an unstabilized check. Each of these solutions is allowed to stand at room temperature in the presence of ordinary room light for 24 days, whereupon each of these solutions is rated on a scale of 0 for colorless to 10 denoting complete decomposition and high discoloring. Employing this procedure, the check solution is completely black at the end of the test, receiving a rating of 10, whereas the stabilized solutions are colorless receiving a rating of 0, thus demonstrating that ethylene glycol is singularly effective in the stabilization of alpha-chloro-p-xylene for a period of greater than 24 days.

*Example II*

Employing the stabilizer test given in Example I, a polypropylene glycol having a molecular weight of about 150 receives ratings of 0 for each of the five concentrations given in Example I for a period of greater than 28 days.

*Example III*

Polypropylene glycol having a molecular weight of about 2025 demonstrates complete stabilization of alpha-chloro-p-xylene employing the procedure given in Example I at the respective concentrations over a period of greater than 28 days.

*Example IV*

Polyethylene glycol having a molecular weight of about 300 also affords complete stabilization of alpha-chloro-p-xylene employing the procedure given in Example I at the respective concentrations given over a period of greater than 28 days.

*Example V*

Alpha-chloro-p-xylene is stabilized employing the procedure given in Example I and polyethylene glycol having a molecular weight of about 400 for a period greater than 28 days employing the concentration given in Example I.

*Example VI*

The effectiveness of polyethylene glycol having a molecular weight of about 300 as a stabilizer for alpha-chloro-p-xylene is demonstrated employing 25 ml. of alpha-chloro-p-xylene placed in each of three 4-ounce clear glass containers. The polyethylene glycol is added to the first of these solutions in a concentration of 0.125 g. A metal contaminant, comprising 50 mg. of ferric chloride is added to each container, the latter two solutions being employed as standardized checks. Each of these solutions is allowed to stand at room temperature for a period of greater than four days in the presence of ordinary room light, whereupon each of the solutions is rated on a scale from 0 for colorless to 10 denoting complete decomposition and high discoloring. Employing this procedure, the standard check solutions decompose violently upon addition of the ferric chloride, whereas after four days the polyethylene glycol-containing solutions received a rating of 0, thus demonstrating that the polyethylene glycol of this example is singularly effective in the stabilization of alpha-chloro-p-xylene.

*Example VII*

In order to demonstrate the effectiveness of a polyethylene glycol having a molecular weight of about 300 as a stabilizer for benzyl chloride, a procedure is carried out employing 25 ml. of benzyl chloride placed in each of six 4-ounce clear glass containers. The polyethylene glycol is added to the first five solutions in concentrations of 0.0125 g., 0.025 g., 0.125 g., 0.250 g., and 0.500 g., respectively. A metal contaminant comprising 50% iron powder and 50% iron oxide is then added in concentrations of from 0.01 g. to 0.5 g. per container. A series of six solutions was made up in this manner, the latter two solutions being employed as unstabilized checks. Each of these solutions is allowed to stand at room temperature in the presence of ordinary room light for a period of greater than 28 days whereupon each is rated on a scale from 0 for colorless to 10 denoting complete decomposition and high discoloring. Employing this procedure, the standard check solution is completely black at the end of the period employed, whereas the stabilized solution received ratings of 2, 2, 2, 1, and 0 for the above concentrations in their respective order, thus demonstrating that a polyethylene glycol is effective in the stabilization of benzyl chloride as well as alpha-chloro-p-xylene for a period of greater than 28 days under the conditions employed.

*Example VIII*

The effectiveness of a polypropylene glycol having a molecular weight of about 1025 in stabilizing benzyl chloride is demonstarted employing the procedure given in Example VII. In this test, the polypropylene glycol affords complete stabilization over a period greater than 28 days for each of the concentrations given.

While the invention has been described in terms of its use in connection with chlorinated xylenes, notatably alpha-chloro-p-xylene, it is not to be thus limited since the invention extends to the stabilization of other similar chlorinated aromatic hydrocarbons either saturated or unsaturated, such as benzyl chloride, dimethyl benzyl chloride, ethyl benzyl chloride, dimethyl benzyl chloride, and the like, or any other chlorinated aromatic hydrocarbons in which a similar stability problem is encountered.

While there have been described various embodiments of the invention, the methods and products described are not intended to be understood as limiting the scope of the invention as it is realized that changes therein are possible, and it is further contended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A stabilized composition of matter comprising essentially a side chain halogenated aromatic hydrocarbon contaminated with metal ions and a stabilizing amount of an aliphatic alkylene glycol.

2. A stabilized composition of matter comprising essentially a side chain halogenated aromatic hydrocarbon contaminated with metal ions and a stabilizing amount of an aliphatic alkylene glycol represented by the structure:

$$HO-(R-O-)_x-R-OH$$

wherein $x$ is a number from 0 to 34, inclusive and R is an alkylene group.

3. A stabilized composition of matter comprising essentially a side chain chlorinated aromatic hydrocarbon contaminated with metal ions and a stabilizing amount of a polyalkylene glycol.

4. A stabilized composition of matter comprising essentially a side chain chlorinated aromatic hydrocarbon contaminated with metal ions and a stabilizing amount of an aliphatic alkylene glycol in combination with another stabilizer.

5. A stabilized composition of matter comprising essentially a side chain chlorinated polyalkyl benzene contaminated with metal ions and a stabilizing amount of an aliphatic alkylene glycol.

6. A stabilized composition of matter comprising essentially a side chain chlorinated polymethyl benzene contaminated with metal ions and a stabilizing amount of an aliphatic alkylene glycol.

7. A stabilized composition of matter comprising essentially a side chain chlorinated xylene contaminated with metal ions and a stabilizing amount of an aliphatic alkylene glycol.

8. A stabilized composition of matter comprising essentially a side chain chlorinated xylene contaminated with metal ions and a stabilizing amount of a polyalkylene glycol.

9. A stabilized composition of matter comprising essentially a side chain halogenated aromatic hydrocarbon contaminated with metal ions and a stabilizing amount of polypropylene glycol.

10. A stabilized composition of matter comprising essentially a side chain chlorinated aromatic hydrocarbon contaminated with metal ions and a stabilizing amount of polyethylene glycol.

11. A stabilized composition of matter comprising essentially a side chain chlorinated aromatic hydrocarbon contaminated with metal ions and a stabilizing amount of ethylene glycol.

12. A stabilized composition of matter comprising essentially a side chain chlorinated xylene contaminated with metal ions and a stabilizing amount of polypropylene glycol.

13. A stabilized composition of matter comprising essentially a side chain chlorinated xylene contaminated with metal ions and a stabilizing amount of polyethylene glycol.

14. A stabilized composition of matter comprising essentially a side chain chlorinated xylene contaminated with metal ions and a stabilizing amount of ethylene glycol.

15. The method of stabilizing a side chain halogenated aromatic hydrocarbon contaminated with metal ions comprising essentially contacting said halogenated aromatic hydrocarbon with aliphatic alkylene glycol.

16. The method of stabilizing a side chain chlorinated aromatic hydrocarbon contaminated with metal ions comprising essentially contacting said side chain chlorinated aromatic hydrocarbon with a stabilizing amount of an aliphatic alkylene glycol.

17. The method of stabilizing a side chain chlorinated aromatic hydrocarbon contaminated with metal ions comprising essentially contacting said side chain chlorinated aromatic hydrocarbon with a stabilizing amount of an aliphatic alkylene glycol represented by the structure:

$$HO-(R-O-)_x-R-OH$$

wherein $x$ is a number from 0 to 34, inclusive and R is an alkylene group.

18. The method of stabilizing a side chain chlorinated polymethyl benzene contaminated with metal ions comprising contacting said side chain chlorinated polymethyl benzene with a stabilizing amount of an aliphatic alkylene glycol.

19. The method of stabilizing a side chain chlorinated xylene contaminated with metal ions comprising contacting said side chain chlorinated xylene with a stabilizing amount of an aliphatic alkylene glycol.

20. The method of stabilizing a side chain halogenated aromatic hydrocarbon contaminated with metal ions comprising contacting said side chain halogenated aromatic hydrocarbon with a stabilizing amount of a polypropylene glycol.

21. The method of stabilizing a side chain halogenated aromatic hydrocarbon contaminated with metal ions comprising contacting said side chain halogenated aromatic hydrocarbon with a stabilizing amount of polyethylene glycol.

22. The method of stabilizing alpha-chloro-p-xylene contaminated with metal ions which comprises contacting said alpha-chloro-p-xylene with a stabilizing amount of polypropylene glycol.

23. The method of stabilizing alpha-chloro-p-xylene contaminated with metal ions comprising contacting said alpha-chloro-p-xylene with a stabilizing amount of polyethylene glycol.

24. The method of stabilizing alpha-chloro-p-xylene contaminated with metal ions comprising contacting said alpha-chloro-p-xylene with a stabilizing amount of ethylene glycol.

25. A composition according to claim 7 wherein the chlorinated xylene is alpha-chloro-p-xylene and the glycol is added in an amount of about 0.0001% to 5% by weight of the xylene.

References Cited in the file of this patent

UNITED STATES PATENTS

| | | |
|---|---|---|
| 2,355,319 | Morris et al. | Aug. 8, 1944 |
| 2,371,644 | Petering et al. | Mar. 20, 1945 |
| 2,722,557 | Danison | Nov. 1, 1955 |